US005572384A

United States Patent [19]
Kumagai et al.

[11] Patent Number: 5,572,384
[45] Date of Patent: Nov. 5, 1996

[54] MAGNETIC DISK DRIVE DEVICE HAVING LEAD WIRE HOLDING STRUCTURE

[75] Inventors: Toru Kumagai; Mitsuru Ide, both of Nagano, Japan

[73] Assignee: Kabushiki Kaisha Sankyo Seiki Seisakusho, Nagano, Japan

[21] Appl. No.: 216,281

[22] Filed: Mar. 23, 1994

[30] Foreign Application Priority Data

Mar. 23, 1993 [JP] Japan .................. 5-019237 U

[51] Int. Cl.$^6$ .................................................. G11B 17/02
[52] U.S. Cl. .................................................. 360/99.08
[58] Field of Search .......................... 360/98.07, 99.04, 360/99.08; 310/71

[56] References Cited

U.S. PATENT DOCUMENTS 4,773,828  9/1988  Hagiwara et al. .................. 417/354
5,189,327  2/1993  Dotsuka et al. .................... 310/71
5,214,331  5/1993  Yonei ................................ 310/71

*Primary Examiner*—Robert S. Tupper
*Attorney, Agent, or Firm*—Sughrue, Mion, Zinn, Macpeak & Seas

[57] ABSTRACT

A magnetic disk drive device has a hub for driving a magnetic disk when the magnetic disk is placed on the hub. A drive magnet is fastened to the inner surface of the hub. A stator core, with a coil wound thereabout, is located in opposition to the drive magnet. A frame is provided for fixedly supporting the stator core. A cutout portion is formed in the bottom of the frame, and a flexible printed circuit is disposed within the cutout portion. The coil terminal wires of the stator core and flexible lead wires are connected to the flexible printed circuit. A plural number of protrusions integral with the frame are disposed within the cutout portion. An arc-shaped lead wire holder, which is arc-shaped along the circumference of the frame, is fitted to the plural number of protrusions.

2 Claims, 6 Drawing Sheets

MAGNETIC DISK DRIVE DEVICE HAVING LEAD WIRE HOLDING STRUCTURE

BACKGROUND OF THE INVENTION

1. Field of the Invention

The present invention relates to a magnetic disk drive device.

2. Related Art

A magnetic disk drive device as illustrated in FIGS. 6 and 7 has been known.

The magnetic disk drive device illustrated is of the so-called central shaft fixing type. For simplicity of illustration, only the right half of the structure with respect to the center line is illustrated.

In FIGS. 6 and 7, a central shaft portion 1a integral with a frame 1 is extended at the central part of the frame. A stator core 3 is fastened to the tubular portion of the frame 1, close to the central shaft portion 1a thereof. A coil 4 is wound about the stator core 3. Bearings 5, axially separated, are fit into a space between the central shaft portion 1a of the frame 1 and a hub 7 in a manner such that the inner rings of the bearings are in contact with the outer surface of the central shaft portion 1a and the outer rings of the bearings 5 are in contact with the inner wall of the hub 7. The hub 7 is disposed so as to cover the upper side and the outer side of the combination of the stator core 3 and the coil 4. A magnetic disk, not illustrated, is placed on the hub 7 in a state that the hub is inserted into the center hole of the magnetic disk. A ring-like drive magnet 8 is fastened to the inner wall of the hub, which confronts with the stator core 3.

A hole 1b is formed in the portion of the frame 1, right under the coil 4. A cutout portion 1c is formed in the bottom of the frame including the hole 1b. Coil terminal wires, not shown, are led from the coil 4. Within the frame 1 the coil terminal wires are connected to lead wires 9. The lead wires 9 are fixed within the hole 1b by means of adhesive 11. The lead wires 9 are further fixed within the cutout portion 1c by means of a clamp member 13. The lead wires 9 are connected to a power supply means, located outside the motor. A drive power is fed from the power supply means through the lead wires 9 to the coil 4, which in turn turn rotates the hub 7 with a magnetic disk set thereto.

In FIG. 6, reference numeral 10 denotes a connector, and 12, a sealing means.

In the magnetic disk drive device that is described above, the lead wires 9 are used for supplying an electric power to the coil 4. The magnetic disk drive device of the type in which a flexible printed circuit is used for the same purpose is also known.

This type of the magnetic disk drive device is shown in FIGS. 8 and 9. In those figures, like reference numerals are used for designating like portions in FIGS. 6 and 7. Description of those like portions is omitted.

In FIGS. 8 and 9, a cutout portion 1d, larger than the cutout portion 1c, is formed in the bottom of the frame 1. A flexible printed circuit 16 is bonded within the cutout portion 1d. The flexible printed circuit 16, extended outside the motor, is constructed such that a conductor pattern 16a is formed on the base made of insulating material, and a cover of insulating material is layered on the conductor pattern 16a. Coil terminal wires 14 are led out of the motor, through the hole 1b of the frame 1, and soldered to soldering lands 15, exposed or not covered with the cover of the flexible printed circuit 16.

A drive power is supplied from the power supply means to the coil 4 of the motor, by way of a route of the conductor pattern 16a and the soldering lands 15 of the flexible printed circuit 16, and the coil terminal wires 14.

The conventional magnetic disk drive devices as described above have the following problems.

In the magnetic disk drive device of the type in which the drive power is supplied to the motor by the lead wires 9, the coil terminal wires and the lead wires 9 must be connected within the frame 1. Accordingly, the wire connection work is difficult. The result of the wire connection is poor in reliability.

In the magnetic disk drive device of the type in which the flexible printed circuit 16 is used for supplying the motor drive power, the wire connection work is easy, and the result of the wire connection is reliable. However, the flexible printed circuit 16 is costly, and fragile. When receiving an impact, it is easily broken, resulting in disconnection of the printed conductors. The flexible printed circuit 16 is flexible in the axial direction of the motor (vertical direction in the drawing), but is inflexible in the direction of an arrow A in FIG. 9. The flexible printed circuit cannot be moved, even slightly, in the same direction. This limits the layout freedom of the device. Namely, the problems of both types of devices are different from each other.

SUMMARY OF THE INVENTION

Accordingly, an object of the present invention is to provide a magnetic disk drive device which is free from the patterned conductor disconnection, has a good layout freedom, and is easy in connection of the wires, high in reliability, and low in cost.

To achieve the above object, there is provided a magnetic disk drive device comprising: a hub for driving a magnetic disk set to the hub; a drive magnet fastened to the inner surface of the hub; a stator core with a coil wound thereon, said stator core being confronted with the drive magnet, and a frame for fixedly supporting the stator core, a cutout portion being formed in the bottom of the frame, a plurality of protrusions integral with the frame, which are disposed within the cutout portion; a flexible printed circuit disposed within the cutout portion, coil terminal wires of the stator core and flexible lead wires being connected to the flexible printed circuit; and an arc-shaped lead wire holder fit to the plurality of protrusions to fixedly hold the flexible lead wires, the arc-shaped lead wire holder being arc-shaped so as to follow along the circumference of the frame.

With such a construction, the coil terminal wires of the stator core are connected to the flexible printed circuit outside the frame. The wire connection work is easier than for the device of the type using the lead wires for drive power supply, and the result of the wire connection is more reliable. Since the flexible printed circuit is located only within the cutout portion, the flexible printed circuit used is smaller than that in the device of the type using the flexible printed circuit for drive power supply. The lead wires led out of the flexible printed circuit are inexpensive. The means to fix the flexible lead wires and the way to fix them are relatively simple. The result is to reduce the cost of the product. Since the lead wires are used outside the motor and flexible, there is a less chance of disconnecting the wires. A satisfactory layout freedom is obtained.

DETAILED DESCRIPTION OF THE PREFERRED EMBODIMENTS

The preferred embodiments of the present invention will be described with reference to the accompanying drawings.

Figure 1:
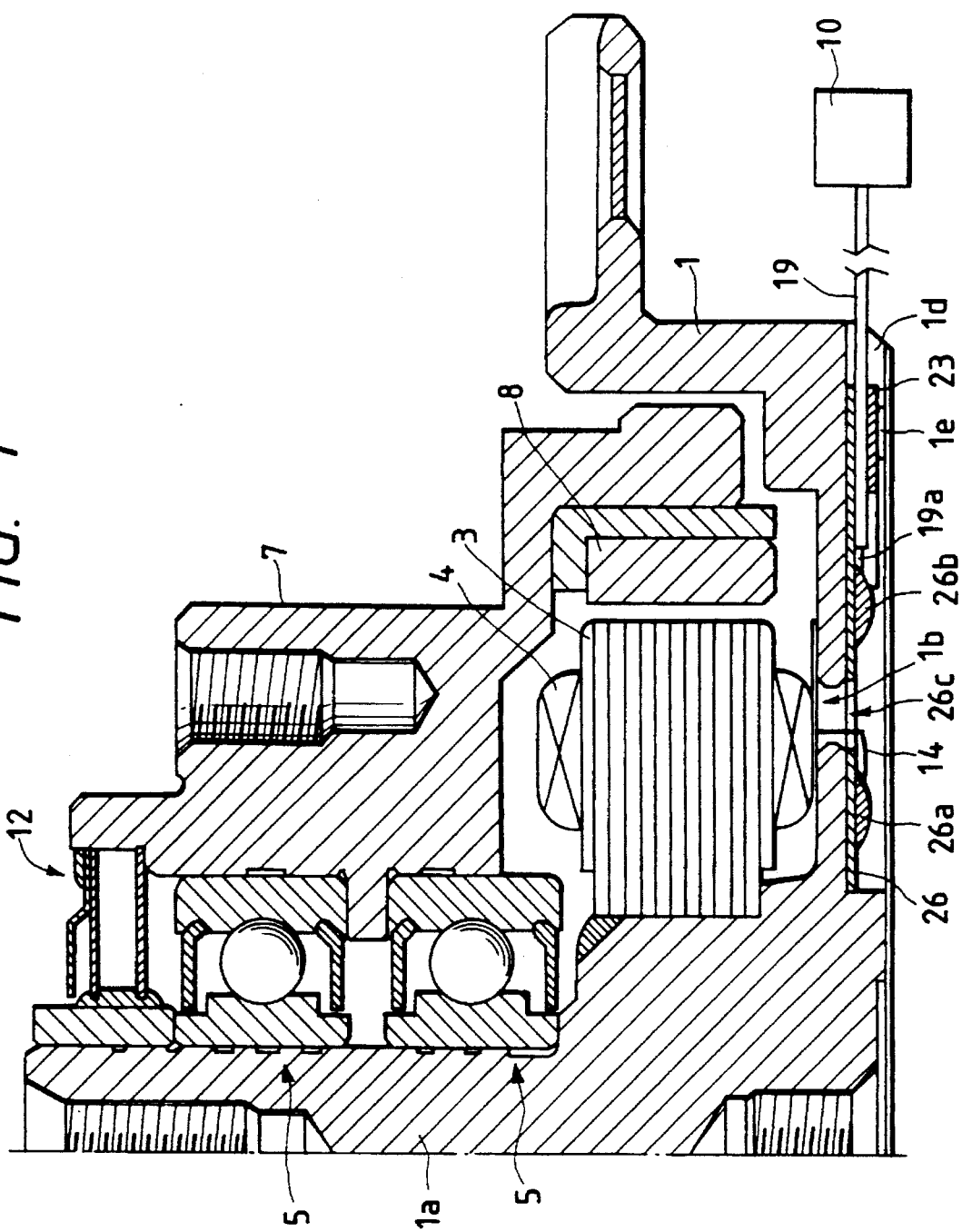
FIG. 1 is a cross sectional view showing a magnetic disk drive device according to an embodiment of the present invention.

FIG. 1 is a cross sectional view showing a magnetic disk drive device according to a first embodiment of the present invention. In the figure, like reference numerals are used for designating like portions in the drawings used for describing the conventional art. Description of those like portions is omitted.

The magnetic disk drive device of this embodiment is different from the conventional art in that a flexible printed circuit 26 and lead wires 19 are used for the construction of the drive power supply, while putting the advantages of the devices of the type using the lead wires and the flexible printed circuit to good use.

The embodiment of the present invention will now be described in more detail.

Figure 3:
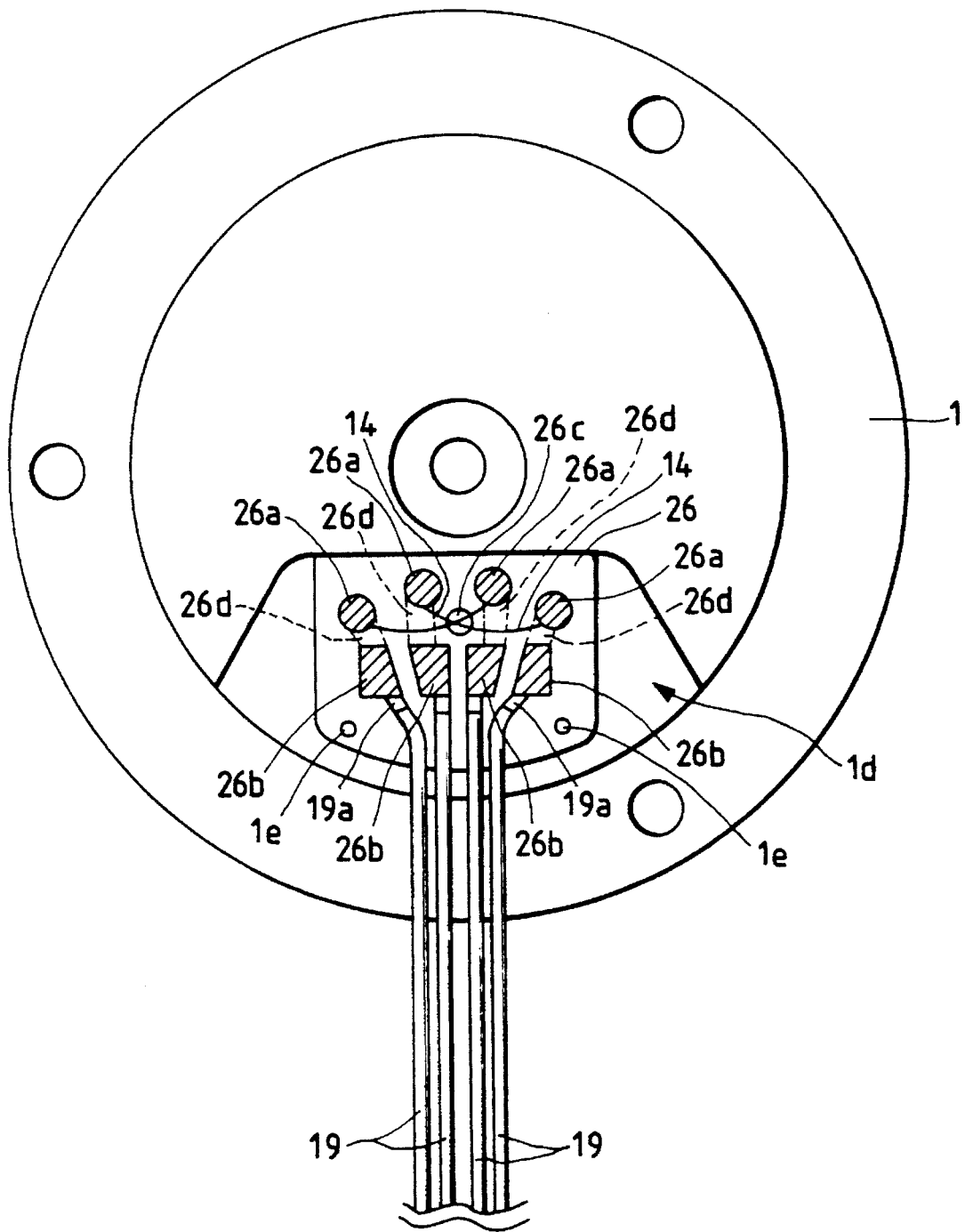
FIG. 3 is a bottom view showing the magnetic disk drive device before a wire holder is mounted.
Figure 8:
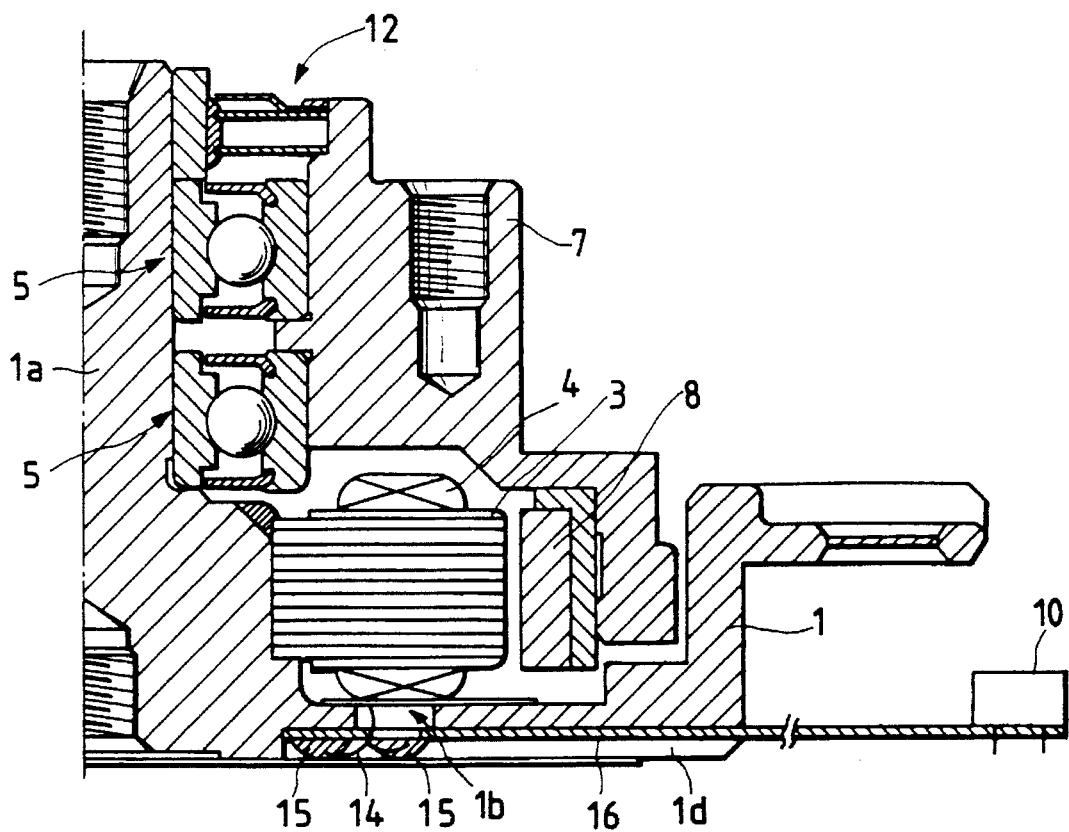
FIG. 8 is a cross sectional view showing another conventional magnetic disk drive device.
Figure 9:
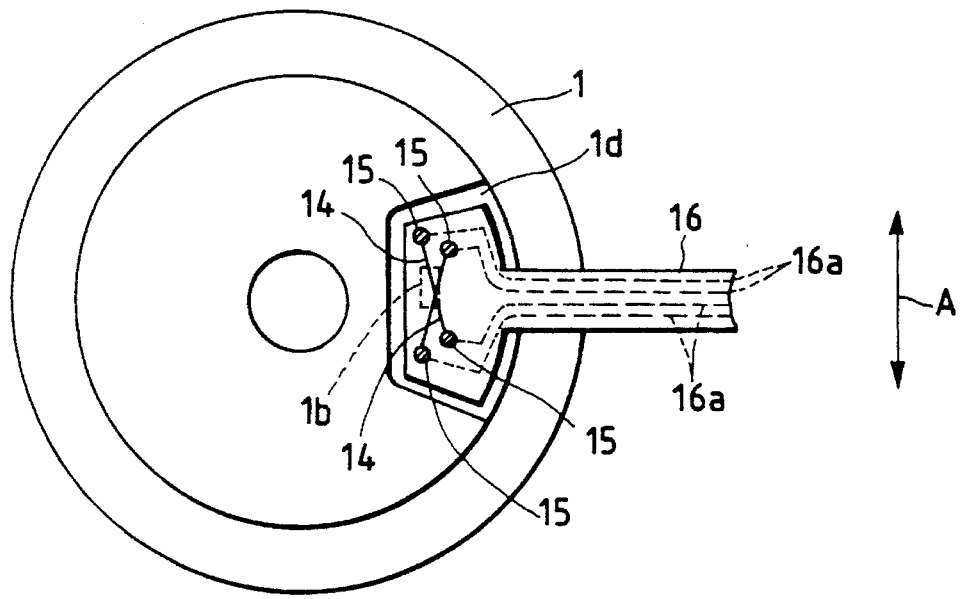
FIG. 9 is a bottom view showing the magnetic disk drive device of FIG. 8.

Referring to FIGS. 1 and 3, a cutout portion 1d, comparable in size with that shown in FIGS. 8 and 9, is formed in the bottom of the frame 1. A flexible printed circuit 26 is bonded within the hole 1b. The flexible printed circuit 26 is constructed such that a conductor pattern 26d is formed on the base or board made of insulating material, and a cover of insulating material is layered on the conductor pattern 26d. A hole 26c, formed in the flexible printed circuit 26, is located right under the hole 1b of the frame 1. Coil terminal wires 14 are led out of the motor, through the hole 1b of the frame 1 and the hole 26c of the flexible printed circuit 26, and soldered to soldering lands 26a, not covered with the cover of the flexible printed circuit 26. The conductor pattern 26d connected to the terminal wire soldering lands 26a are connected to lead wire soldering lands 26b of the flexible printed circuit 26. The lead wire cores 19a of the lead wires 19 are soldered to the lead wire soldering lands 26b, exposed or not covered with the cover. The lead wires 19, which are flexible, are extended outside the motor.

Figure 2:
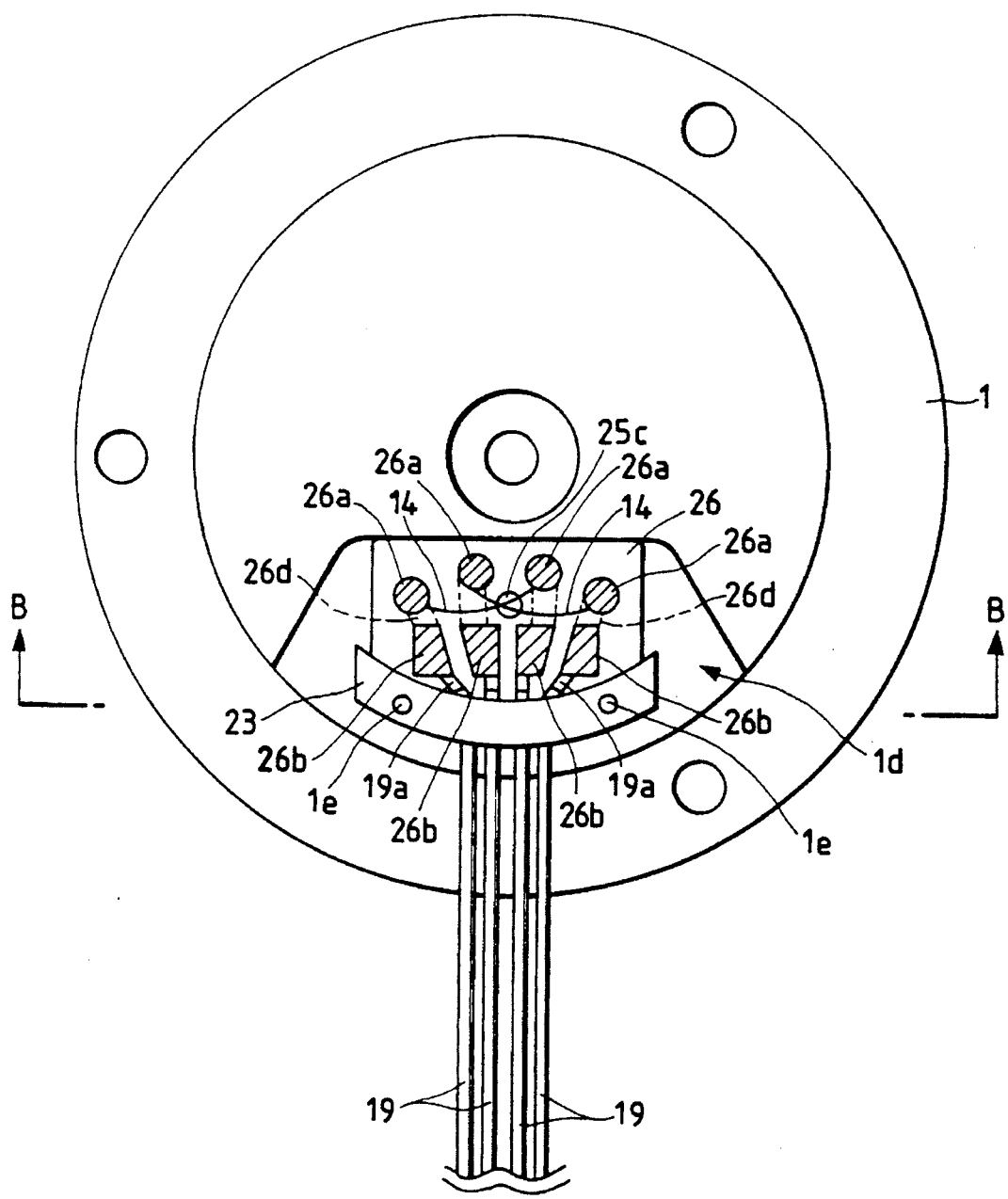
FIG. 2 is a bottom view showing the magnetic disk drive device.
Figure 4:
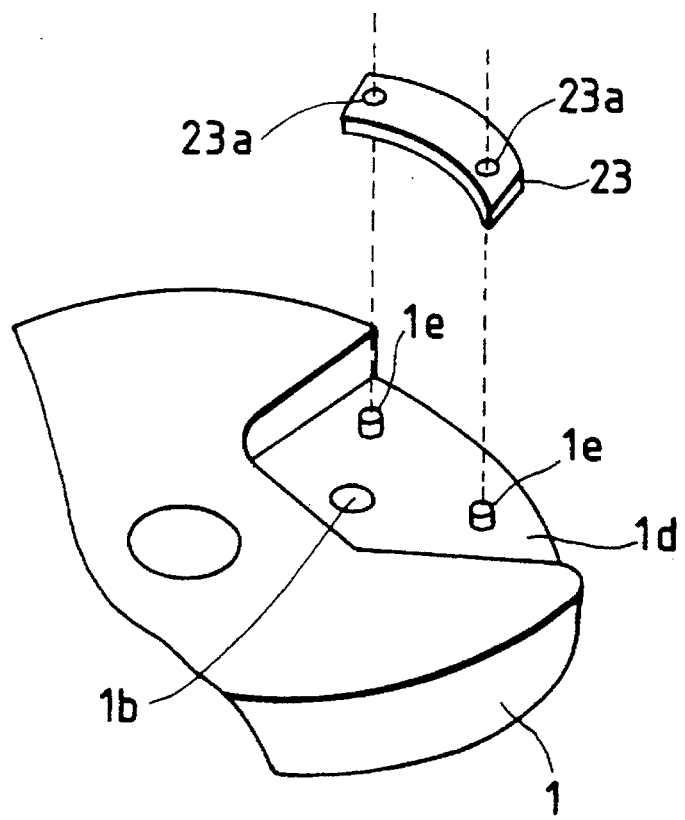
FIG. 4 is an exploded view showing a portion of the device including a frame and a wire holder.
Figure 5:
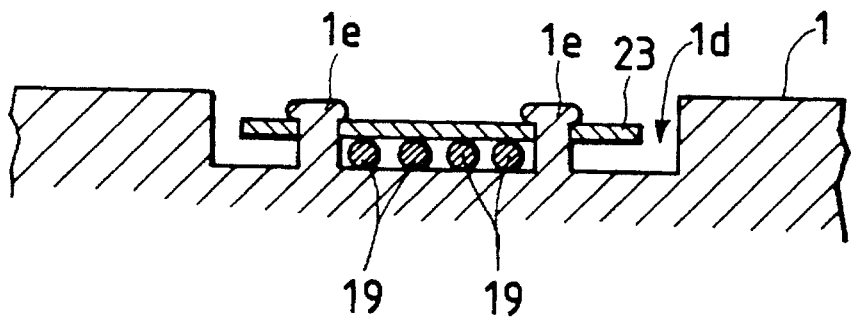
FIG. 5 is a cross sectional view taken on line B—B in FIG. 2.
Figure 6:
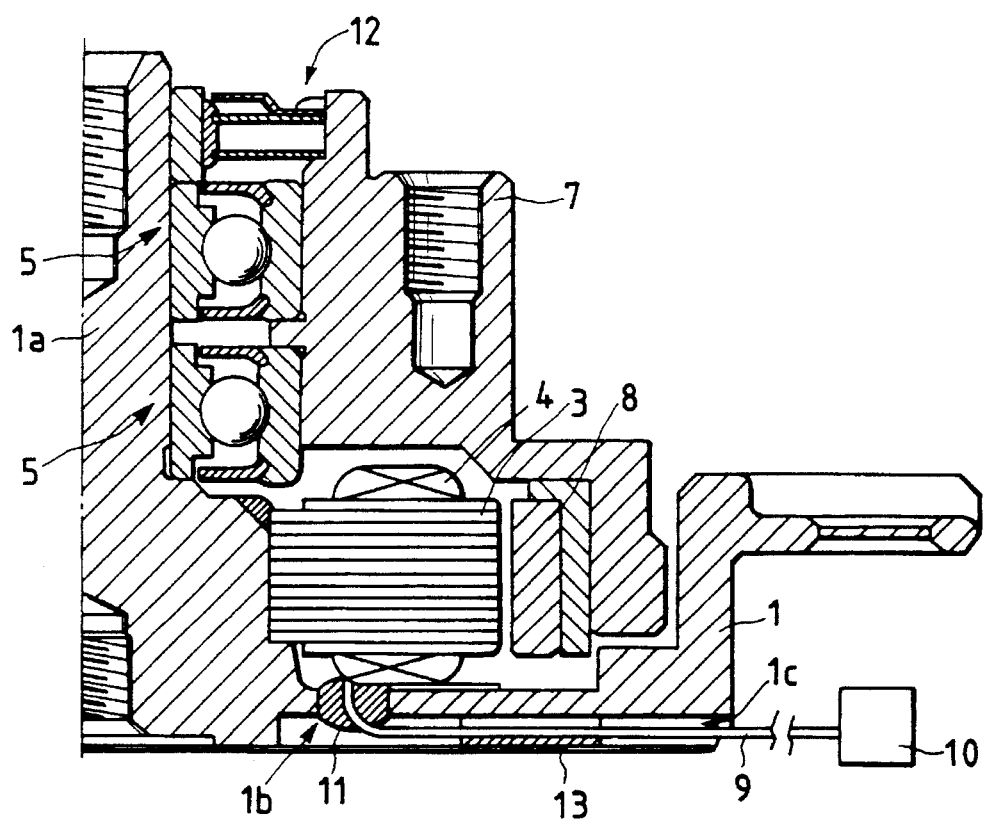
FIG. 6 is a cross sectional view showing a conventional magnetic disk drive device.
Figure 7:
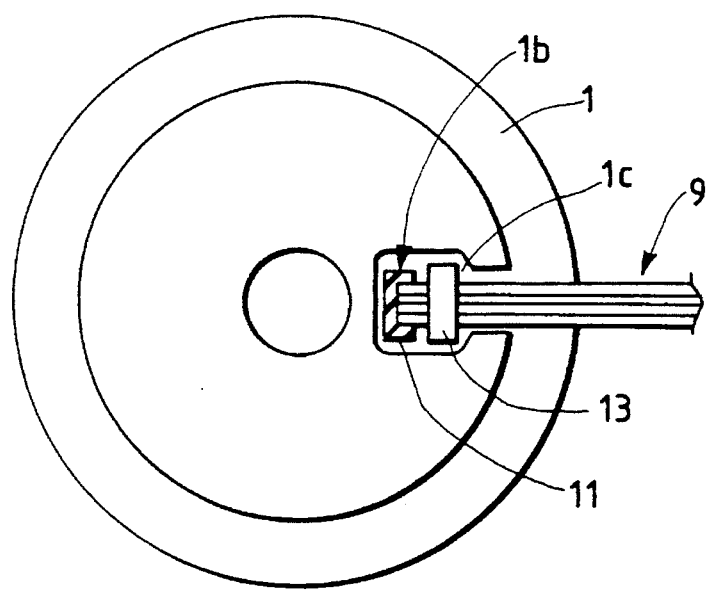
FIG. 7 is a view showing the magnetic disk drive device of FIG. 6 when seen from the bottom.

A couple of protrusions 1e, integral with the frame 1, are protruded upward within the cutout portion 1d, as shown in FIGS. 3 and 4. The four lead wires 19 are located within the two protrusions 1e. The protrusions 1e are inserted into holes 23a of the wire holder 23, respectively. The wire holder 23, made of metal, such as stainless steel, is arc-shaped so as to follow along the circumference of the frame 1. The lead wires 19 are pressed against the frame 1 by the wire holder 23, as shown in FIGS. 2 and 5. In this state, the tops of the protrusions 1e are caulked. Accordingly, the lead wire cores 19a of the lead wires 19 are substantially fixed by the wire holder 23.

A drive power is fed from a power supply means, not shown, to the coil 4 of the motor, by way of a route of the lead wires 19, the lead wire soldering lands 26b, and the coil terminal wires 14. The result is to rotate the hub 7.

In FIG. 4, for simplicity of illustration, the flexible printed circuit 26 and the lead wires 19 are not illustrated.

As described above, the coil terminal wires 14 are connected to the flexible printed circuit 26 outside the frame 1. The connection work is easy and the result of the wire connection is reliable as compared with the device which merely uses the lead wires.

Since the flexible printed circuit 26 is located only within the cutout portion 1d, the flexible printed circuit used is smaller than that in the device of the type using the flexible printed circuit for drive power supply. The lead wires 19 led out of the flexible printed circuit are inexpensive. Further, the protrusions 1e are integral with the frame 1. To hold the lead wires 19, the protrusions 1e are inserted into the holes of wire holder 23, and their tops are caulked. Accordingly, the means to fix the flexible lead wires and the way to fix them are relatively simple. The result is to reduce the cost of the product.

Since the lead wires 19 are used outside the motor and are flexible, there is a less chance of disconnecting the wires as compared with the device which uses the flexible printed circuit. A satisfactory layout freedom is obtained and the were is free from the fear of unintentional disconnection.

In this embodiment, the lead wire cores 19a are fixed by the wire holder 23 located near the lead wire cores 19a of the lead wires 19. With this, if the lead wires 19 are pulled, the lead wire cores 19a will never be disconnected from the lead wire soldering lands 26b.

Further, the inner side of the wire holder 23 is arc-shaped or curved inward so as to prevent the inner side thereof from coming in contact with the lead wire cores 19a of the lead wires 19 and the lead wire soldering lands 26b. This enables the wire holder 23 to be made of metal such as a stainless steel. Therefore, the lead wires 19 can be held more firmly by the wire holder 23.

While the present invention has been described using a specific embodiment, it is understood that the present invention is not limited to the embodiment, but may variously be changed, modified and altered within the scope of the invention. For example, the frame and the central shaft portion may be separately formed, while those are integral with each other in the above-mentioned embodiment.

Three or more number of the protrusions 1e and the holes 23a of the wire holder 23 may be used.

To secure a reliable holding of the lead wires 19, the wire holder 23 is made of metal, e.g., stainless steel, in the above-mentioned embodiment. If required, the wire holder 23 may be made of resin.

The magnetic disk drive device may be of the central shaft rotary type, while that of the embodiment is of the central shaft fixing type.

As seen from the foregoing description, the coil terminal wires of the stator core are connected to the flexible print circuit outside the frame. The wire connection work is easier than for the device of the type using the lead wires for drive power supply, and the result of the wire connection is more reliable.

Since the flexible print circuit is located only within the cutout portion, the flexible print circuit used is smaller than that in the device of the type using the flexible printed circuit for drive power supply. The lead wires led out of the flexible printed circuit are flexible and inexpensive. Further, the protrusions are integral with the frame. To hold the lead wires, the protrusions are inserted into the holes of the wire holder, and their tops are caulked. Accordingly, the means to fix the flexible lead wires and the way to fix them are relatively simple. The result is to reduce the cost of the product.

Since the lead wires are used outside the motor and flexible, there is a less chance of disconnecting the wires. A satisfactory layout freedom is obtained.

What is claimed is:

1. A magnetic disk drive device comprising:

a hub for driving a magnetic disk placed on the hub;

a drive magnet fastened to an inner surface of the hub;

a stator core with a coil wound thereon, the stator core being confronted with the drive magnet, the coil having terminal wires;

a frame for fixedly supporting the stator core, a cutout portion formed in the surface of the frame which is opposite to the surface with the stator core fastened thereto;

a plurality of flexible lead wires for connection to a power supply;

a plurality of protrusions disposed within the cutout portion of the frame;

a lead wire holder fitted to the plurality of protrusions and which presses the flexible lead wires against the frame; and a flexible printed circuit, for electrically connecting the terminal wires and the flexible lead wires, disposed within the cutout portion, the flexible printed circuit including a hole through which the terminal wires of the coil wound about the stator core pass;

terminal wire soldering lands for electrically connecting the terminal wires led through the hole directly to the flexible printed circuit; and lead wire soldering lands for electrically connecting the flexible lead wires directly to the flexible printed circuit.

2. The magnetic disk drive device according to claim 1, wherein the lead wire holder is arc-shaped so as to follow along the circumference of the frame.

* * * * *